US012762476B2

(12) United States Patent
Odibat et al.

(10) Patent No.: US 12,762,476 B2
(45) Date of Patent: Oct. 13, 2026

(54) AI CUSTOMIZED MLOPS FRAMEWORK IN A MULTI-TENANT CLOUD ENVIRONMENT

(71) Applicant: Kyndryl, Inc., New York, NY (US)

(72) Inventors: Omar Odibat, Cedar Park, TX (US); Umar Mohamed Iyoob Umar, Pflugerville, TX (US); Mouleswara Reddy Chintakunta, Allagadda (IN); Manish Mitruka, Pune (IN); Gail Camille Guerrero, Plano, TX (US)

(73) Assignee: Kyndryl, Inc., New York, NY (US)

( * ) Notice: Subject to any disclaimer, the term of this patent is extended or adjusted under 35 U.S.C. 154(b) by 893 days.

(21) Appl. No.: 18/110,074

(22) Filed: Feb. 15, 2023

(65) Prior Publication Data

US 2024/0273396 A1 Aug. 15, 2024

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 11,526,754 B2 * 12/2022 Odibat .................. G06F 16/906
11,574,215 B2 * 2/2023 Zeng ...................... G06N 20/00
11,632,438 B2 * 4/2023 Rahn .................. G06Q 30/0637 709/223
2018/0096028 A1 4/2018 Masekera et al.
2019/0102700 A1 * 4/2019 Babu ...................... G06N 20/00
2019/0370694 A1 * 12/2019 Diamanti ............... G06N 20/00
2019/0386890 A1 * 12/2019 Baughman ............. G06N 3/126
2020/0265509 A1 * 8/2020 Kumar Addepalli ........................ G06F 21/101
2021/0318912 A1 * 10/2021 Hashimoto ......... H04L 41/5045
2021/0334677 A1 * 10/2021 Zeng ...................... G06N 20/00
(Continued)

OTHER PUBLICATIONS

Microsoft, "Azure Data Factory", https://azure.microsoft.com/en-in/products/data-factory/, Accessed Feb. 9, 2023; 8 Pages.
(Continued)

*Primary Examiner* — Maikhanh Nguyen
(74) *Attorney, Agent, or Firm* — Erik Swanson; Andrew D. Wright; Calderon Safran & Wright P.C.

(57) ABSTRACT

A computer implemented system, method, and computer program product are disclosed for managing a machine learning model operation (MLOps) for cost forecasting models. The MLOps receives a request for a subscription machine learning (ML) model by a tenant having a corresponding tenant configuration profile and automatically selects a subscription ML model in a model registry based on the tenant configuration profile. The MLOps deploys the selected subscription ML model to the tenant and monitors usage by the tenant of the currently operating ML model at a pre-determined refresh frequency. The MLOps determines whether the currently operating ML model exceeds a pre-determined accuracy threshold, and automatically deploys a second subscription ML model from the model registry to the tenant in place of the currently operating ML model in response to the pre-determined accuracy threshold being exceeded.

20 Claims, 11 Drawing Sheets

(56) References Cited

U.S. PATENT DOCUMENTS

2021/0390455 A1 12/2021 Schierz et al.

OTHER PUBLICATIONS

Najafi et al., "Implementing a Multi-Tenant MLaaS Build Environment with Amazon SageMaker Pipelines", AWS Partner Network (APN) Blog, Mar. 10, 2022; 8 Pages.
H2O MLOPS, "Operate AI Models with Transparency, Scale and Confidence", https://h2o.ai/platform/ai-cloud/operate/h20-mlops/, Accessed Feb. 9, 2023; 9 Pages.
H20.ai, "Enterprise Stream", https://h2o.ai/content/dam/h2o/en/marketing/documents/2019/02/Enterprise-Steam_v1.pdf, Accessed Feb. 14, 2023; 2 Pages.
Mell et al., "The NIST Definition of Cloud Computing", NIST, Special Publication 800-145, Sep. 2011, 7 pages.

* cited by examiner

AI CUSTOMIZED MLOPS FRAMEWORK IN A MULTI-TENANT CLOUD ENVIRONMENT

BACKGROUND

Aspects of the present invention relate generally to life-cycle management of machine learning (ML) models in a multi-tenant cloud computing environment, and, more particularly, to a system and method for managing core capabilities of continuous integration and continuous deployment (CI/CD) in artificial intelligence (AI) model development environments, champion-challenger testing, model versioning, and storage/rollback of AI/ML models.

Multi-tenancy in a cloud environment is a reference to a mode of operation of software where multiple independent instances of one or multiple applications operate in a shared environment. The instances (tenants) are logically isolated, but physically integrated.

SUMMARY

In a first aspect of the invention, there is a computer-implemented method including: receiving a request for a subscription machine learning (ML) model by a tenant having a corresponding tenant configuration profile; automatically selecting one of at least one subscription ML models in a model registry based on the tenant configuration profile and in response to receiving the request for the subscription ML model; deploying, by a multi-tenant cloud server, the automatically selected subscription ML model to the tenant as a currently operating ML model; monitoring, by the multi-tenant cloud server, usage by the tenant of the currently operating ML model at a pre-determined refresh frequency, the pre-determined frequency based at least on the tenant configuration profile and the configuration profile category of the currently operating ML model; determining whether the currently operating ML model exceeds a pre-determined accuracy threshold; and automatically deploying by the multi-tenant cloud server a second subscription ML model from the model registry to the tenant in place of the currently operating ML model and becoming the currently operating ML model in response to the pre-determined accuracy threshold being exceeded.

In another aspect of the invention, there is a computer program product including one or more computer readable storage media having program instructions collectively stored on the one or more computer readable storage media. The program instructions are executable to: receive a request for a subscription machine learning (ML) model by a tenant having a corresponding tenant configuration profile; automatically select one of at least one subscription ML models in a model registry based on the tenant configuration profile and in response to receiving the request for the subscription ML model; deploy the automatically selected subscription ML model to the tenant as a currently operating ML model; monitor usage by the tenant of the currently operating ML model at a pre-determined refresh frequency, the pre-determined frequency based at least on the tenant configuration profile and the configuration profile category of the currently operating ML model; determine whether the currently operating ML model exceeds a pre-determined accuracy threshold; and automatically deploy a second subscription ML model from the model registry to the tenant in place of the currently operating ML model and becoming the currently operating ML model in response to the pre-determined accuracy threshold being exceeded.

In another aspect of the invention, there is system including a processor, a computer readable memory, one or more computer readable storage media, and program instructions collectively stored on the one or more computer readable storage media. The program instructions are executable to: receive a request for a subscription machine learning (ML) model by a tenant having a corresponding tenant configuration profile; automatically select one of at least one subscription ML models in a model registry based on the tenant configuration profile and in response to receiving the request for the subscription ML model; deploy the automatically selected subscription ML model to the tenant as a currently operating ML model; monitor usage by the tenant of the currently operating ML model at a pre-determined refresh frequency, the pre-determined frequency based at least on the tenant configuration profile and the configuration profile category of the currently operating ML model; determine whether the currently operating ML model exceeds a pre-determined accuracy threshold; and automatically deploy a second subscription ML model from the model registry to the tenant in place of the currently operating ML model and becoming the currently operating ML model in response to the pre-determined accuracy threshold being exceeded.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
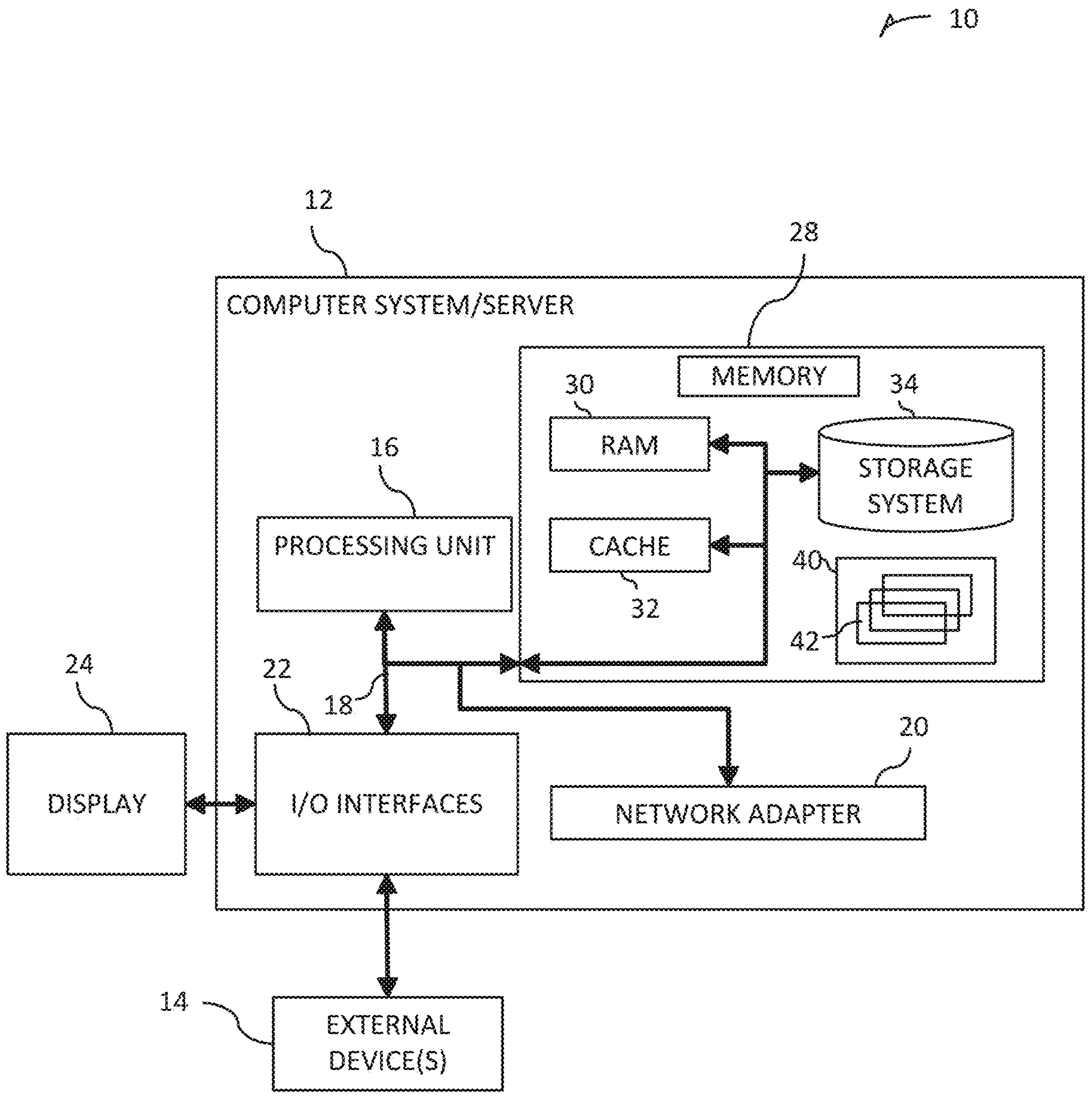
FIG. 1 depicts a cloud computing node, according to an embodiment of the present invention.

Aspects of the present invention relate generally to life-cycle management of machine learning (ML) models in a multi-tenant cloud computing environment, and, more particularly, to a system and method for managing core capabilities of continuous integration and continuous deployment (CI/CD) in artificial intelligence (AI) model development environments, champion/challenger testing, model versioning, and storage/rollback of AI/ML models. This type of monitoring and management system is often referred to as "Model Ops."

In embodiments, a customized Model Ops (MLOps) framework is used in a multi-tenant cloud environment. The MLOps framework may identify model accuracy drift and select alternate or refreshed models for use by a tenant. A dynamic configuration may be used to provide an appropriate frequency for refreshing a model. It will be understood that a refresh frequency may differ based on the ultimate application of the models for a tenant.

In embodiments, an operation or MLOps framework is established that can store models and model versions with the following details: target, prediction, accuracy, tenant/overall champions, categoric features list, numeric features list, etc. The tenant metadata, e.g., profiles and usage history, may be stored. The MLOps framework orchestrates the deployment of models using an AI Model dynamic model selector (DMS) to pick the best base model.

In particular, the DMS may be configured to help automatically identify the best model to use for each tenant. In an example, a tenant may want to use a virtual machine (VM) profiling model. The DMS may use the tenant's configuration profile to select the correct VM profiling model version (X, Y or Z) for a specific tenant.

An automated model refresh may be based on results from another AI model, e.g., a dynamic configuration for model monitoring (DCMM) to select the right frequency and accuracy thresholds. The DCMM may provide the optimal frequency and best thresholds for model refresh, in response to a specific tenant, the cost spends, and other operational constraints. In the discussion herein, "model frequency" refers to how often a model may be refreshed based on current cost spends from the tenant, e.g., daily, weekly, or monthly. Other model frequencies may be used based on the tenant's customized configuration, for instance, hourly, daily, weekly, semi-weekly, bi-weekly, monthly, semi-monthly, bi-monthly, annually, and semi-annually, etc.

The term "model performance threshold" as used herein, may also be referred to as a model metric value. The model performance threshold may trigger a model refresh in response to the model metric value being lower than a model performance threshold, e.g., 80%, 70%, 76%, etc.

In embodiments of the present disclosure, configurations may use two sets of parameters. One set of parameters may be controlled offline by a data scientist such as: target, prediction, numerical and categorical features. The second set of parameters may be controlled by a machine learning (ML) model that will dynamically pick the right values per tenant for a refresh frequency and the right values per tenant for a refresh threshold. In an example, for one customer (tenant A), the monitoring might run every week. In another example, for a second customer (tenant B), the monitoring might be run every day, or every hour, etc.

Implementations of various embodiments may provide an improvement in the technical field of multi-tenancy cloud environments. In particular, the cloud environment includes operational ML models that may be used for multiple tenants in the course of their business practice to forecast cloud usage. Reusing an operational ML model and/or generating multiple versions of the same base model improves efficiency of the cloud environment in terms of storage and speed. An ML model, also referred to herein as "model Ops," or "MLOps," may be used to monitor and refresh the operational models that a tenant uses to forecast cloud usage in the conduct of their business. As elements of the tenant's business evolve over time, operational ML models may become inaccurate and/or obsolete. The MLOps framework, as described herein, enables the cloud environments and cloud servers to act more efficiently for multiple tenants. Accordingly, the MLOps provides an improvement to cloud server processor throughput/load, storage requirements for each model, etc. Further, the MLOps may keep the tenants' models up-to-date and accurate for business purposes.

Implementations of various embodiments may provide an improvement in the technical field of identifying and refreshing ML models used by customers of a cloud environment. In particular, implementations use machine learning to train an AI-based dynamic model selector (DMS) to automatically identify the best model for each tenant at runtime, with either minimal or no human intervention. Implementations may transform an article to a different state or thing, for instance, modifying/updating tenant profiles and cloud environment ML model variants, and deployment of the ML model variants to tenants. In particular, implementations may cause a secondary device to perform a requested action and update stored context and state information related to the machine learning functions. Historical information may be dynamically updated along with configuration profiles for the tenants. In the present disclosure, by automating the machine learning cost forecasting models for cloud usage, time and cost savings may be provided to tenants. In known systems, a data scientist was needed to update the tenants' forecasting models. In contrast, in embodiments, by automating this step using machine learning, the tenant may perform cost optimization, determine whether to switch cloud service providers, or switch a usage plan with the same provider. For example, a tenant may spend $1 million per month on their cloud services. A quick cost forecast that identifies a near future increase to $2 million per month may allow the tenant to avoid future increases earlier. Accordingly, the tenant may save money.

Implementations of the present invention are necessarily rooted in computer technology. For example, the operations of the claims that recite use of the ML models for DMS and DCMM are computer-based and cannot be performed in the human mind. Training and using a machine learning model are, by definition, performed by a computer and cannot practically be performed as a mental process (or with pen and paper) due to the complexity and massive amounts of calculations involved. For example, an artificial neural network (ANN) may have millions or even billions of weights that represent connections among nodes in one or more layers of the model. Values of these weights are adjusted, e.g., via backpropagation and stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model. For purpose of brevity, the term "neural network" may be used herein as an equivalent to the more accurate term of "artificial neural network" to indicate a computer-based artificial intelligence methodology.

It should be understood that, to the extent implementations of the invention collect, store, or employ personal information provided by, or obtained from, individuals (for example, tenant configuration information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
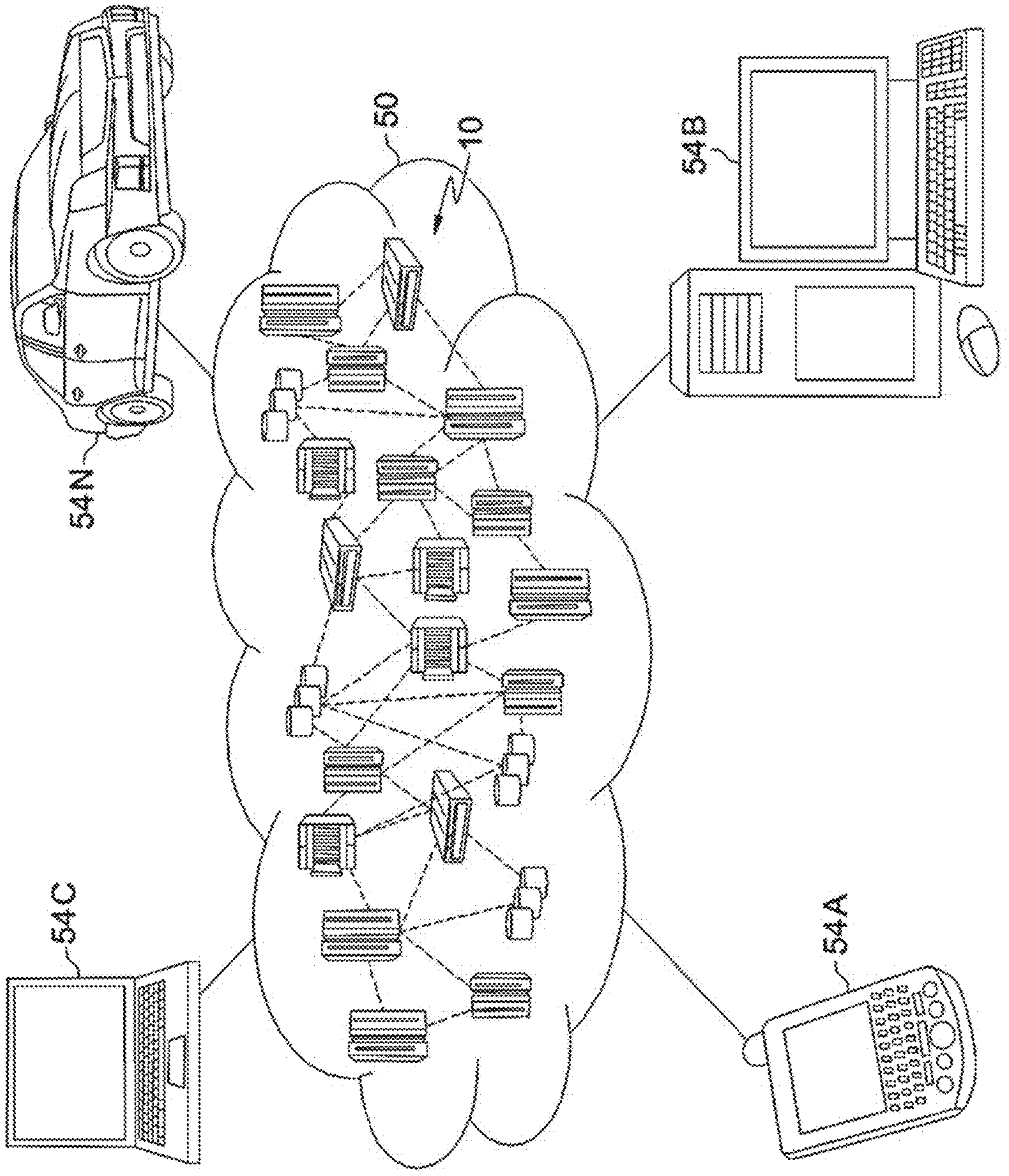
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
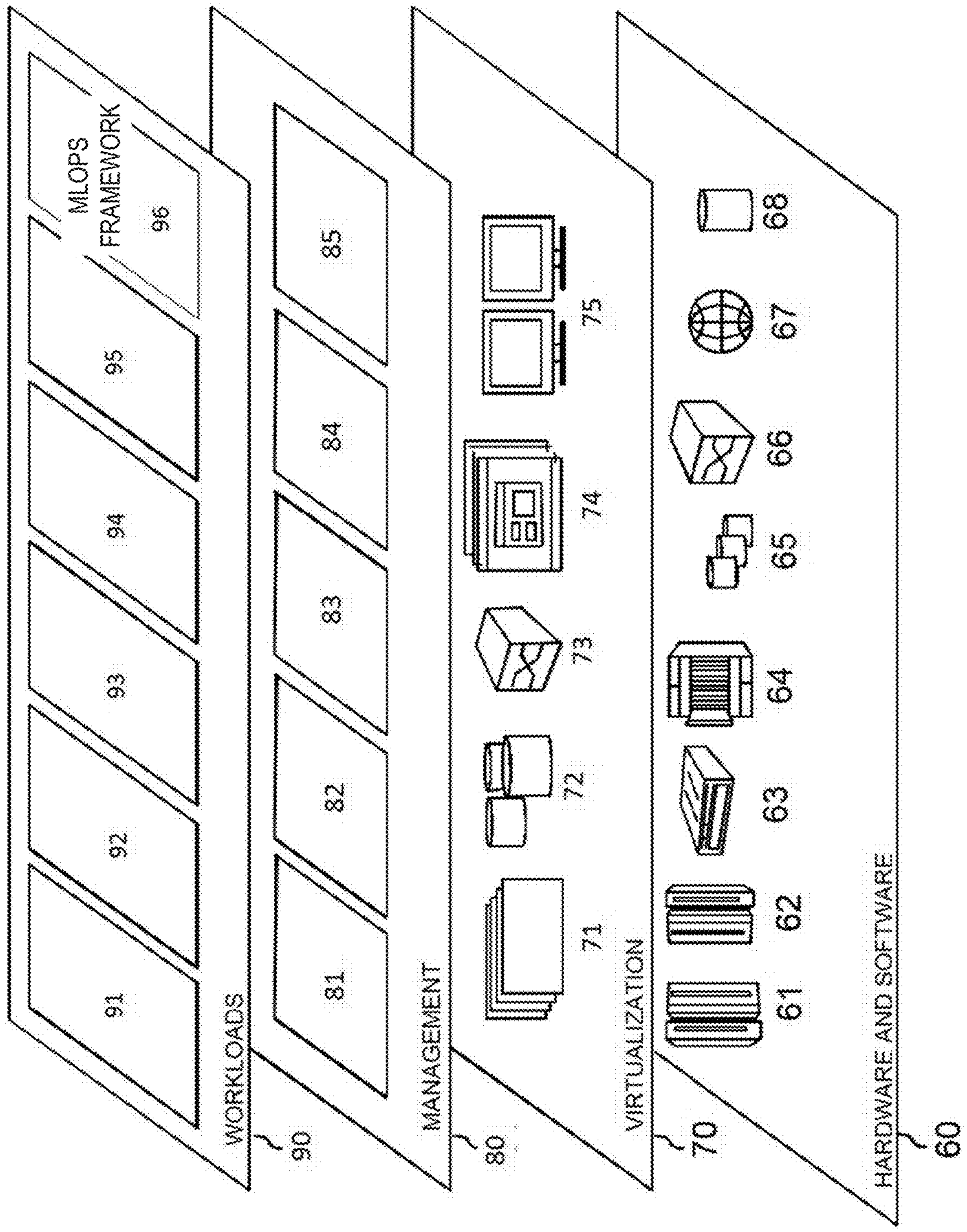
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and MLOps framework 96.

Implementations of the invention may include a computer system/server 12 of FIG. 1 in which one or more of the program modules 42 are configured to perform (or cause the computer system/server 12 to perform) one of more functions of the MLOps framework 96 of FIG. 3. For example, the one or more of the program modules 42 may be configured to: manage multiple sets of operational ML models and provide one or more operational ML models to various cloud tenants. The program modules 42 of MLOps framework 42 may also be configured to monitor the cloud tenants' usage of the operational ML models and provide appropriate refresh of the models to ensure that the tenants are using accurate and up-to-date models. In an example, a tenant subscribes to one of the operational ML models to forecast their use of cloud resources and predict future needs. The tenant has a corresponding configuration profile with information on their business and the desired outputs of the operational ML model, with respect to their cloud needs. The program modules 42 of MLOps framework monitors the tenant's use of the operation ML model to identify accuracy of the operational models and provides a refresh of the operational ML model when indicated. The program modules 42 of MLOps framework uses a dynamic configuration for model monitoring (DMCC) which uses information in the tenant's configuration profile to inform the refresh frequency and accuracy desired. The program modules 42 of MLOps uses a dynamic model selector (DMS) to select operational ML model variations or versions to deploy to the tenant.

Figure 4:
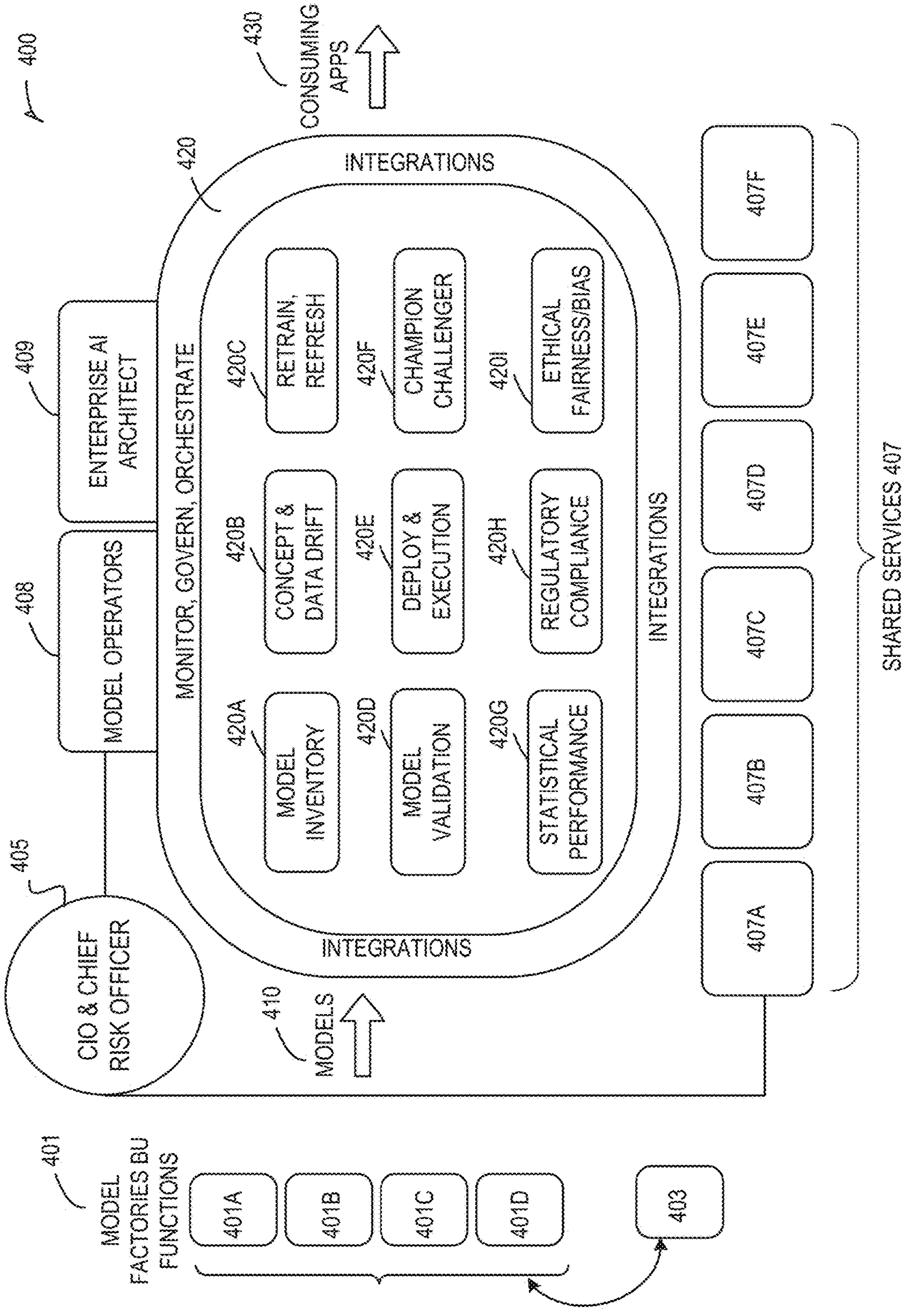
FIG. 4 illustrates a block diagram of an exemplary Model Ops environment, in accordance with aspects of the invention.

FIG. 4 illustrates a block diagram of an exemplary Model Ops environment, in accordance with aspects of the invention. Model Ops is the governance and life cycle management of a wide range of operationalized AI/ML models and includes core capabilities (CI/CD) integration, model development environments, champion/challenger testing, model versioning, model store and rollback. It will be understood that champion/challenger is a method that allows different approaches to testing predictive models in a production environment. Champion/challenger is a similar concept to A/B testing from a marketing perspective. In an exemplary multi-tenant cloud environment, tenants subscribe to one or more operational ML models to forecast their cloud resource usage. Model factories 401 may provide a number of functional models for various business units. For instance, services provided may include cloud machine learning (ML) services 401A, independent model factories 401B, model frameworks 401C and development tools 401D. Data scientists 403 provide support for services 401A-D.

In an example, the multi-tenant cloud environment 400 includes shared services 407 which may comprise data operations (DataOps) services 407A; development operations (DevOps) services including an open-source continuous integration/continuous delivery and deployment (CI/CD) automation software DevOps tool 407B written in the Java programming language, and cloud services 407C; IT services 407D; compliance and risk model risk management (MRM) services 407E; and data visualization services 407F.

In an exemplary embodiment, the lifecycle of tools and services used by a tenant may be automated 410. A CIO or chief risk officer 405 may also drive the lifecycle of tools and models used. Model operators 408 may work with an enterprise AI architect 409 to develop an automated lifecycle that monitors, governs, and orchestrates the use of pre-developed models 410 to provide integration with a tenant's business forecasting needs. For example, as a tenant's business expands, their use of the cloud, for instance for hosting an online marketplace or customer service chatbot may significantly increase. Thus, being able to forecast future cloud resource needs can assist the tenant in determining whether they might need to increase storage device capacity, rehost applications, modify their SLAs with providers, etc., based on their resource and cost constraints. Elements of the lifecycle may include modules for managing: model inventory 420A; concept and data drift 420B; retrain and refresh of operational ML models 420C; model validation 420D; deployment and execution of models for tenants' use 420E; champion/challenger 420F; statistical performance metrics 420G; regulatory compliance 420H; and ethical fairness/bias compliance 420I. The automated lifecycle provides consuming applications (apps) 430 such as AI-enabled business apps, business intelligence (BI) & analytics, and digital decision systems.

Using a customized model Ops framework, as described herein, may provide a variety of advantages in deploying operational ML models to tenants in a multi-tenant cloud environment. In particular, model development and experimentation of new models, retrained models, or variants of existing operational ML models may take less time because the ML models may be periodically refreshed for the tenant so that inaccurate models are automatically replaced with more accurate models. New or updated operational ML models may be deployed to tenants more quickly because the deployment is automated. Accordingly, delays in waiting for a data scientist to choose to deploy an updated model are avoided. Quality assurance of updated models is inherent in the framework because inaccurate models are automatically updated in favor of more accurate operational ML models. Moreover, handoff of new or updated operational ML models from data scientists to a production team may be seamless.

Figure 5:
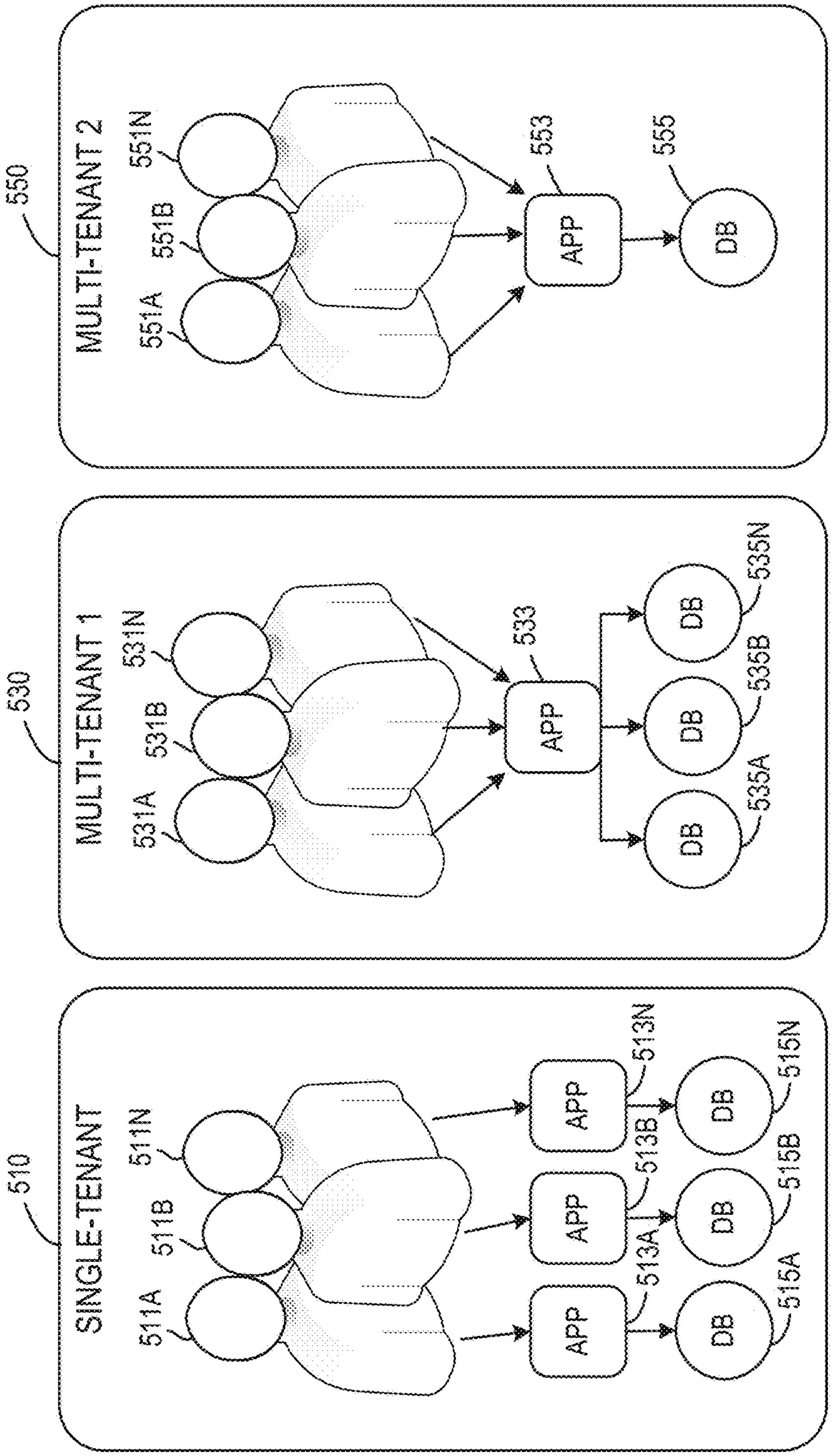
FIG. 5 illustrates a block diagram illustrating various forms of a multi-tenancy environment, in accordance with aspects of the invention.

FIG. 5 illustrates a block diagram illustrating various forms of a multi-tenancy environment, in accordance with aspects of the invention. Multi-tenancy is a reference to the mode of operation of software where multiple independent instances of one or multiple applications operate in a shared environment. The instances (tenants) are logically isolated, but physically integrated. A variety of multi-tenancy forms may be used.

In an example, a single tenant environment 510 may be used. In this example, each user/client 511A-N may operate their own instance of an application 513A-N. It will be understood that while only three users/clients are shown, the number of clients that are currently accessing services or applications in the multi-tenant cloud environment may be more or fewer than the three shown. In this example, each app 513A-N may access a dedicated database (DB) 515A-N.

In another example of a multi-tenant cloud environment 530, clients 531A-N may share access of a single instance of an application 533. Various access control schemes may be used within the app 533 to sequester each client and protect their data from being accessed by an unauthorized client. In this example, each client 531A-N has their own dedicated database 535A-N even though they access the same app or service 533.

In another example, multi-tenant cloud environment 550, clients 551A-N may share access of a single instance of an application 553. Various access control schemes may be used within the app 553 to sequester each client and protect their data from being accessed by an unauthorized client. In this example, the clients 551A-N share a common database 555. Various access control schemes may be used within the database 555 to protect a client's data from access by an unauthorized client.

It will be understood that while each type of multi-tenant cloud environment has its own advantages and disadvantages, that environment 550 may provide more efficiency of data, processing throughput, and device storage because fewer applications need to be deployed and executed in the cloud environment. Database efficiencies may also be realized due to fewer database management systems required to be run, and possibly fewer hardware storage resources required.

Figure 6:
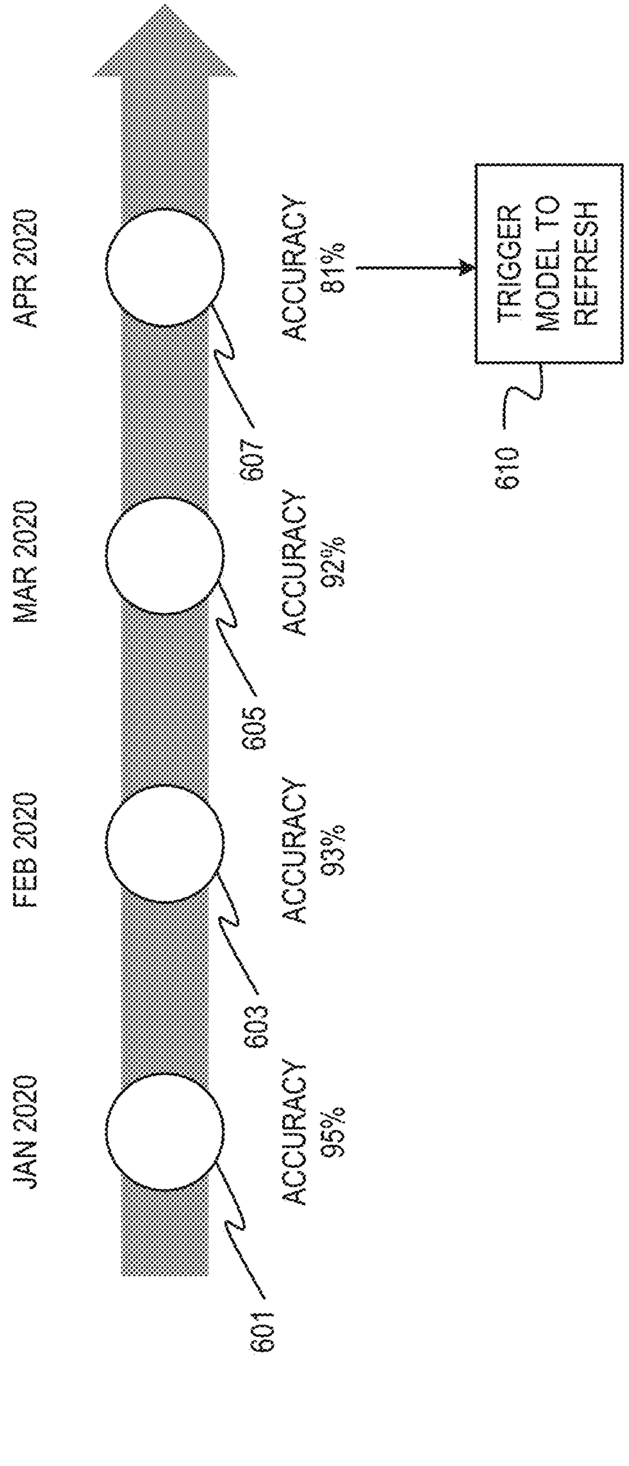
FIG. 6 illustrates model accuracy drifts over time, in accordance with aspects of the invention.

FIG. 6 illustrates model accuracy drifts over time, in accordance with aspects of the invention. A cloud environment provides applications, service, storage, and other resources to clients. In many cases, a client desires to evaluate various aspects of their business, for instance, forecasting, using operational ML models. It may be advantageous for the client to subscribe to a cloud service that provides these operational ML models rather than being forced to have the data scientist and other resources in-house. However, when the client subscribes to these services, accuracy of the analysis output may drift over time, due at least because of changing market or operational conditions corresponding to the client's business. In an example, a client may have 100 customers and 5 products in January. As time moves on, the client may acquire more customers and expand their product base, perhaps to new regions. Thus, models that analyze cost benefit ratios or business efficiency, and cloud usage, for example, may change over time due to different basic information about the business and customer base.

In an example, a client may subscribe to an operational ML model that provides an accuracy of 95% in January 2020 (at 601). In February 2020, the accuracy may decrease to 93% (at 603). In March 2020, the accuracy may decrease to 92% (at 605). This client may find any accuracy over 90% to be acceptable. Updating the model may incur increased costs and the client may prefer to allow this drift. However, in this example, in April 2020, the accuracy is reduced again to only 81% (at 607). This level of accuracy may trigger the client to obtain an automated refresh of the operational ML model (at 610). In contrast, in known systems, this trigger may be performed manually, resulting in delays before use of a more accurate model can be utilized by the client.

Figure 7:
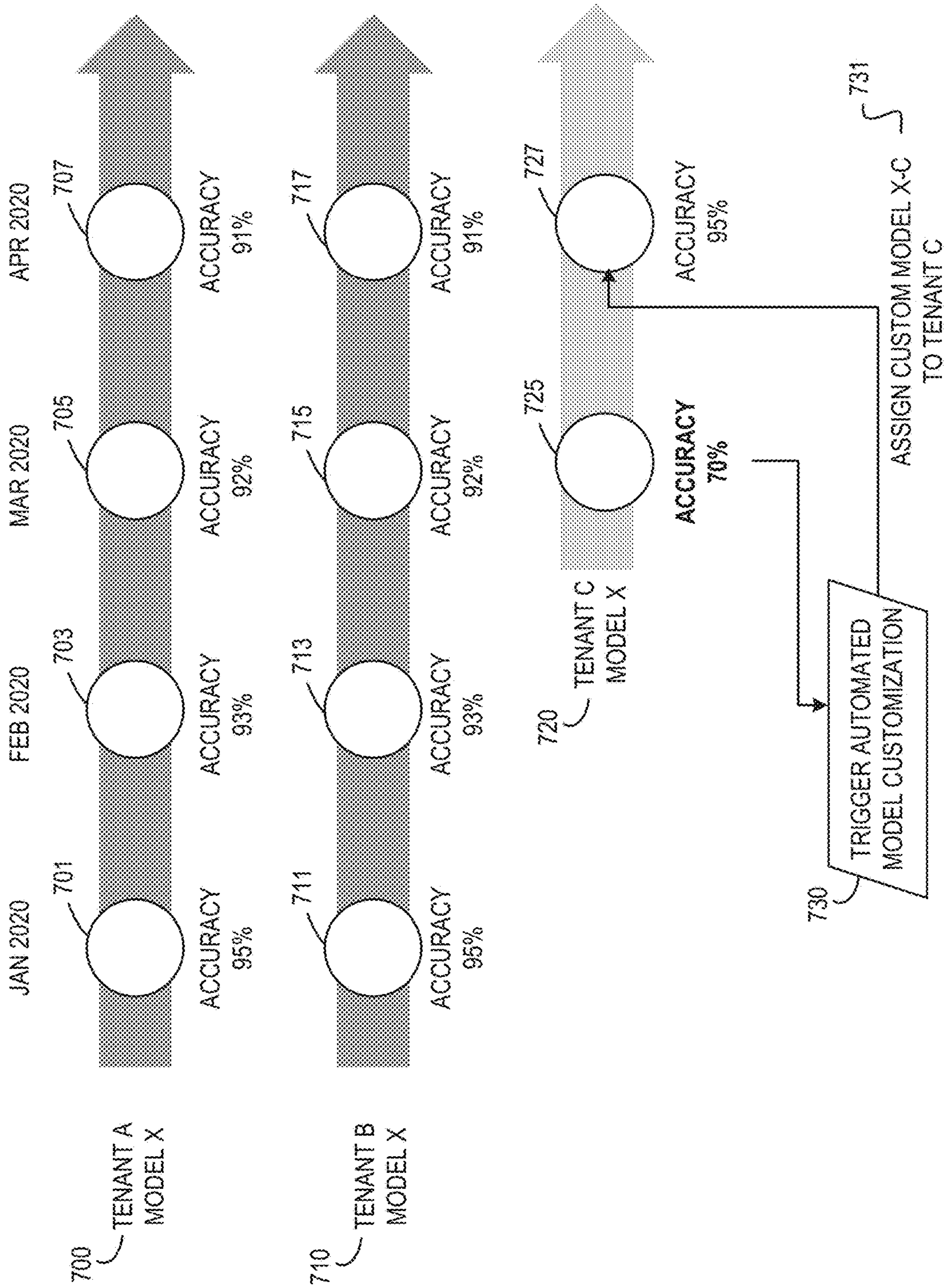
FIG. 7 illustrates model accuracy drifts over time in a multi-tenant environment, in accordance with aspects of the invention.

FIG. 7 illustrates model accuracy drifts over time in a multi-tenant environment, in accordance with aspects of the invention. In this example, three tenants, or clients, 710, 720, and 730 are shown with respect to the accuracy drift of their operational ML models (e.g., Model X) in the cloud environment. Tenant A 700 may experience 95% accuracy in January 2020 at 701, 93% accuracy in February 2020 at 703, 92% accuracy in March 2020 at 705, and 91% accuracy in April 2020 at 707. This level of accuracy may be acceptable to Tenant A 700. Tenant B 710 may experience 95% accuracy in January 2020 at 711, 93% accuracy in February 2020 at 713, 92% accuracy in March 2020 at 715, and 91% accuracy in April 2020 at 717. This level of accuracy may be acceptable to Tenant B 710. In March 2020, Tenant C 720 may subscribe to Model X in the cloud environment. In this example, Tenant C may experience only a 70% accuracy using Model X in March 2020 at 725. This could be because the requirements of Tenant C's business are very different than those of Tenant A 700 and Tenant B 710. This lower level of accuracy could also be because the configuration profile for Tenant C is lacking data, not yet customized, and/or for a variety of other reasons. However, this 70% accuracy in March 2020 may not be acceptable to Tenant C 720.

A configuration profile for the tenant may specify a minimum threshold for accuracy. In embodiments as discussed herein, the MLOps framework monitors the accuracy reached for the various tenants. In this example of FIG. 7, the low accuracy is detected and a model customization at operation 730 may be automatically triggered by the framework. In an example, the MLOps framework may customize Model X with variant X-C and assign this model variant for use by Tenant C at operation 731. In this example, the model usage accuracy with the variant model improves to 95% in April 2020 at 727.

Figure 8:
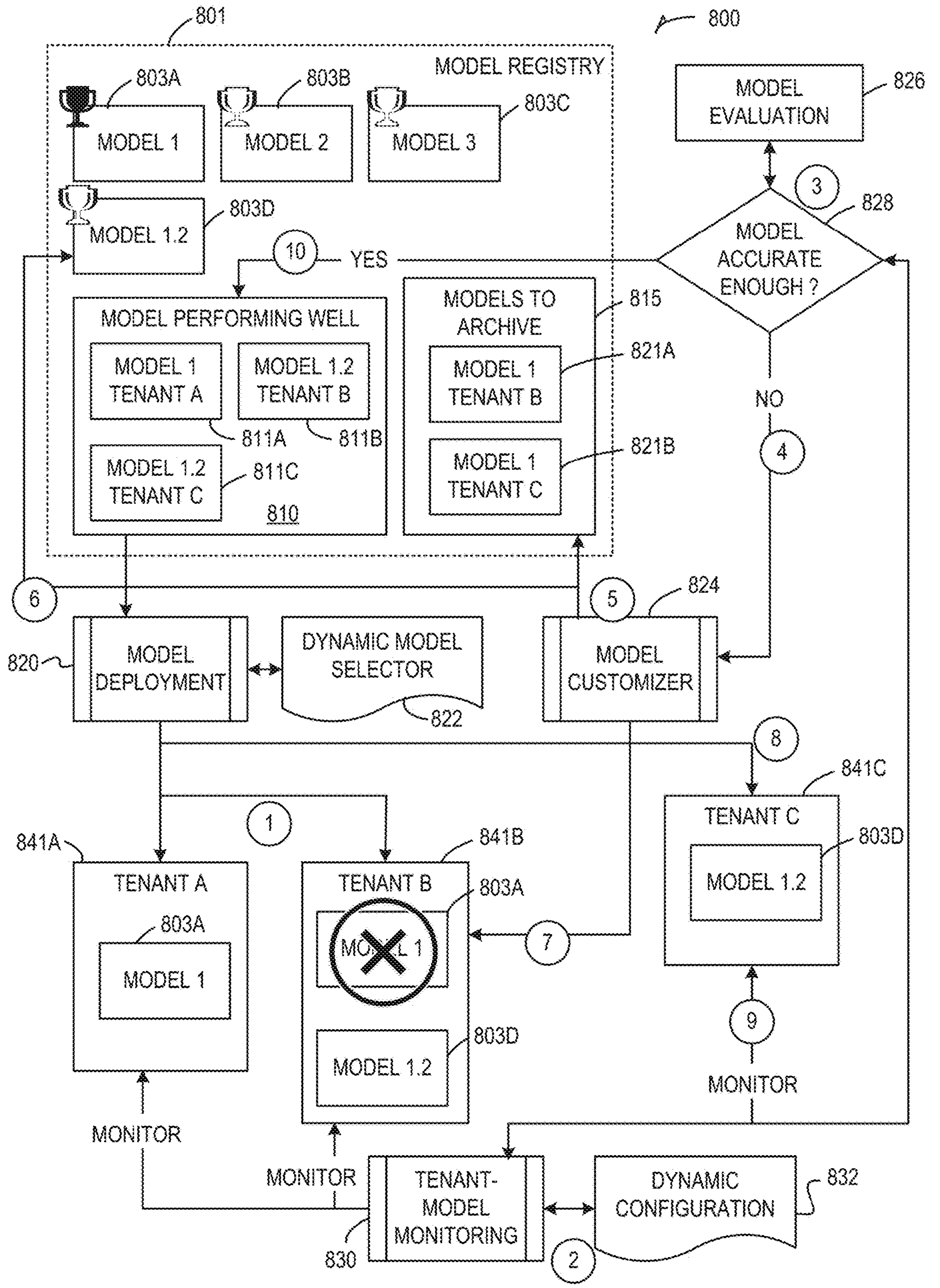
FIG. 8 illustrates a hybrid flow diagram and block diagram depicting a method for managing Model Ops, in accordance with aspects of the invention.

FIG. 8 illustrates a hybrid flow diagram and block diagram 800 depicting a method for managing Model Ops (MLOps), in accordance with aspects of the invention. Typically, a model deployed for client use has a base version. In embodiments, to automatically trigger model refresh, the operational ML models in use by tenants are monitored. In model monitoring, the predictive model performance needs to be regularly monitored to invoke a new iteration in the ML process. Data drift and concept drift also need to be monitored. An ML model may have dozens or hundreds of features or variables in the model. For example, a supervised model may have 70-80 or more variables. Data drift is the change in distribution for each feature over time. Concept drift is change in model performance due to changes in the underlying concept of the business. For example, a mortgage loan business may expand their region and change their approval algorithms. These changes might increase their use of the cloud, for instance for customer service or application interfaces. Thus, if the tenant adds a new region to their business, the model concept may drift and require a refresh. Once a drift is detected, a model refresh may be automatically triggered. By automatically triggering a model refresh, unnecessary delay may be avoided. For example, unnecessary delay in known systems may include waiting for the data scientists to become involved in the monitor/refresh cycle. A model may be refreshed based on certain metrics and pre-defined guidelines in order to keep it relevant and accurate. Providing accurate and relevant models may involve model validation. Refreshed models may need to be verified that they are fit for deployment. In order to verify refreshed models, the model's predictive performance is tested against a specific baseline model. This process for model verification may be more challenging in a multi-tenant environment where each tenant has unique business models, requirements, and desired outcomes from the models.

In known systems, there may be 100 different algorithms that may be used for a tenant for their cloud usage forecasting. A data scientist may need to make educated guesses to determine which subset of those 100 algorithms to test for use with the tenant before selecting one to deploy. For instance, the data scientist may guess that linear regression or logistical regression many be viable candidates, but the testing and validation of these algorithms is time intensive. Further, as the tenant's data changes, the whole process may need to be manually repeated. In the examples discussed herein, the term Model 1 may refer to a particular machine learning (ML) algorithm that may be used or customized for the tenant. The term Model 1.2 may refer to the same algorithm that is trained with different data, or another variant of Model 1. Model 2 may refer to a different algorithm than Model 1 or Model 1.2. In known systems, manually selecting the best model for a tenant is time-consuming, expensive and may be error prone, requiring empirical trial and error tests. Further, refreshing the models when the tenant's data or business changes and degrades the accuracy of the initial model selected may require a full manual refresh. In contrast, embodiments as described herein provide an automated system for selecting, deploying, and refreshing machine learning models for multiple tenants.

Maintaining accurate operational ML Models in multi-tenant environment is important, especially when different tenants may use variations of an original baseline model. Initially, one base model may be selected for all tenants in a specific industry/application or cloud usage category. Visibility or availability of tenant data may also be limited due to legal/security/privacy issues. Further, huge variations in data across tenants may exist or occur over time. Thus, it is desirable to manage multiple models per solution per tenant. In contrast, in known systems, manual processes involved in analyzing tenant specific data, usage profiles and feedback may be cumbersome and cause unnecessary and unacceptable delays.

In embodiments, a framework for multi-tenant MLOps, where each tenant is provided their own customized version of the operational ML model is discussed herein. A model version for a specific project is dynamically selected using an artificial intelligence-based (AI-based) machine learning model operations (MLOps). The MLOps AI-based model is dynamically tuned over time based on service level agreements (SLA), resource constraints, and cost using a new AI model. The model refresh for tenants is triggered based on tenant usage, cost thresholds, and tenant profile along with other approaches, such as data and target drifts. The number of operational ML models needed may depend on similarity across tenants rather than number of tenants. For example, N similar tenants may utilize one operational ML model.

Referring again to FIG. 8, the flow of operations 1-10 are indicated by a circle with the number 1-10. Operations 1-10 are also described in detail below in conjunction with FIG. 11, and referred to as operation (1), operation (2), . . . , and operation (10), for simplicity. In this example, a model repository includes a model registry 801 for base models model 1 (803A), model 2 (803B), and model 3 (803C). Initially, a model is deployed at model deployment 820 for tenant A (841A) and tenant B (841B). A dynamic model selector 822, as discussed in more detail in conjunction with FIG. 9, may be used to select the appropriate model for deployment. As illustrated, model 1 (803A) is initially deployed to both tenant A (841A) and tenant B (841B). Model 1 (803A) may be considered a default "champion" model that has gone thru champion/challenger testing, and is the default for tenants A (841A) and B (841B). Model 2 (803B), model 3 (803C), and model 1.2 (803D) may be champion models for at least one specific tenant. In this illustration the models used by tenant A (841A) and tenant B (841B) are monitored by tenant model monitoring 830. The tenant model monitoring receives a configuration profile from dynamic configuration 832. Tenant model monitoring 830 may be triggered based on time, tenant profiles, data/concept drift and tenant usage, as indicated in the tenant configuration.

The dynamic configuration includes information about the tenant that may drive the version of model used. The dynamic configuration determines the frequency of monitoring and the thresholds which will trigger determining a new model due to drift. Two sets of parameters may be included in the dynamic configuration. One set of parameters may be controlled offline by a data scientist and include target, prediction, numerical and categorical features. Another set may be controlled by an ML model that dynamically picks appropriate values per tenant for (a) refresh frequency, and (b) refresh threshold. For instance, each tenant. i.e., customer, monitoring may be set to a different frequency (i.e., periodicity). In an example, tenant A (841A) may be monitored every week, and tenant B (841B) may be monitored every day.

As illustrated, model evaluation 826 evaluates the model used by each tenant of tenants A-C (841A-C). In embodiments, a determination may be made as to whether each model is accurate enough at decision block 828, based on criteria in the tenant's configuration. If the model does not meet the accuracy threshold, as determined in decision block 828, model customizer 824 is executed to provide a better model. When a new model is indicated, the model registry 801 is updated with the model or model variation that works for the particular tenant. As illustrated, the accuracy of model 1 (803A) being used by tenant B (841B) has drifted beyond a pre-determined accuracy threshold. In this situation, model customizer 824 provides a variation of the model (e.g., model 1.2 (803D)) to tenant B (841B) to accommodate this drift. In embodiments, models either in use or no longer in use may be due to accuracy drift, e.g., tenant B model 1 (821A) and tenant C model 1 (821B) may be archived in the model registry 801 at 815. Optionally, a new customized model or variation, such as model 1.2 (803D) may be set as the new default champion model for use with tenants having a similar configuration to tenant B (841B). In an example, tenant C (841C) will operate with the new default champion model 1.2 (803D).

In FIG. 8, tenant models may continue to be monitored at their requisite frequency by tenant model monitoring 830. When tenant models are identified as performing well, i.e., within the pre-defined accuracy threshold, the tenant models (811A-C) may be recorded in the model registry 801 as models performing well 810.

Figure 9:
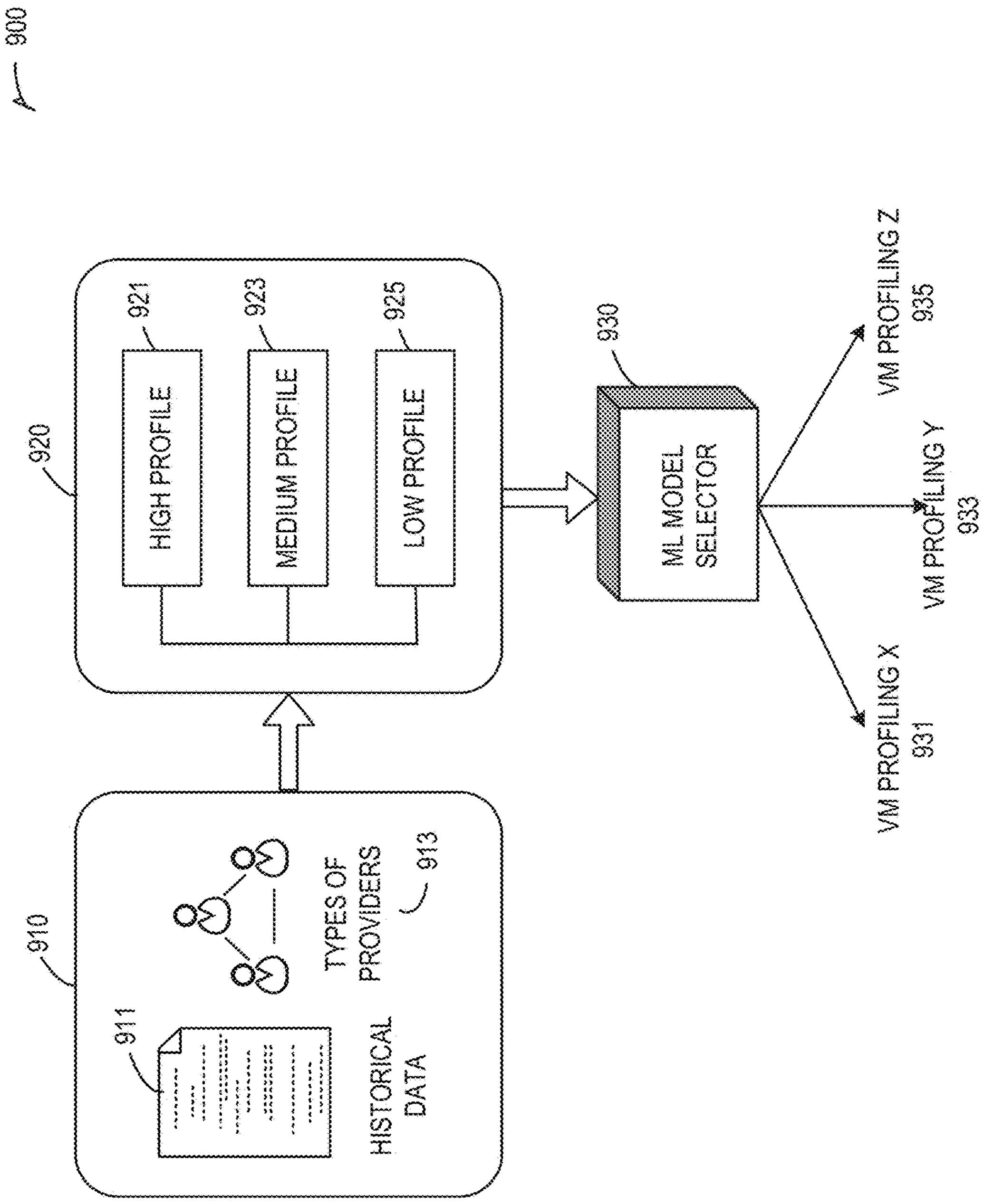
FIG. 9 is a block diagram depicting a dynamic model selector, in accordance with aspects of the invention.

FIG. 9 is a block diagram depicting a dynamic model selector 900, in accordance with aspects of the invention. A dynamic model selector (DMS) 900 aids in the identification of a best model to use for each tenant. The DMS 900 may be automated and may use machine learning (ML) to automate the model selection process. In this illustration, a tenant may want to use a VM profiling model. The DMS model selector 930 may pick a correct VM profiling model version VM Profiling X 931, VM Profiling Y 933, or VM Profiling Z 935 for a specific tenant. The model selector 930 may use the tenant's infrastructure 910 and the features engineering 920 to make a selection. The tenants infrastructure 910 include historical data 911, types of providers 913, and a configuration profile (not shown). Historical infrastructure 910 may further include cost and asset data. Cost data may comprise an asset identifier (AssetID), asset type, unit cost, total cost, region, data center, period, description, and reservation details. Historical infrastructure 910 may also include asset data which may comprise an asset name, utilization, tags, asset source, etc. Selecting the default model corresponds to operation (1) of FIG. 8.

Feature engineering 920 used in the model selector 930 may include a high profile 921, a medium profile 923, and a low profile 925. In an example, a tenant may have the high profile 921 if the customer/tenant has been operating their resources in the cloud a long time (e.g., greater than a predetermined time) such that the customer/tenant understands cloud practices. A tenant may be considered the medium profile 923 when their cloud use is moderate. Lastly, a tenant may be considered the low profile 925 when they have just begun to implement cloud usage and are generally unaware of cloud usage and practices. A more sophisticated tenant, i.e., high profile 921, may inform the model selection with more complex inferences, assuming that the tenant will understand the nuances of the complex model.

In an example, a tenant may want to use a VM profiling model and there may be several versions of this model in the model repository. The DMS 930 may dynamically select a version of the model than will work well for the tenant. In embodiments, a typical classification algorithm such as gradient-boosted decision trees (GBDT), random forest (RF), support vector machines (SVM), or logistic regression model may be used to classify tenant by using the historical infrastructure data 910 and feature profile 920. Once classified, the infrastructure data and profile information are passed to the DMS 930. In embodiments, the DMS 930 uses an ML classification algorithm as discussed above to classify a given tenant that corresponds to a preferred version of the VM Profile model that should be used.

Figure 10:
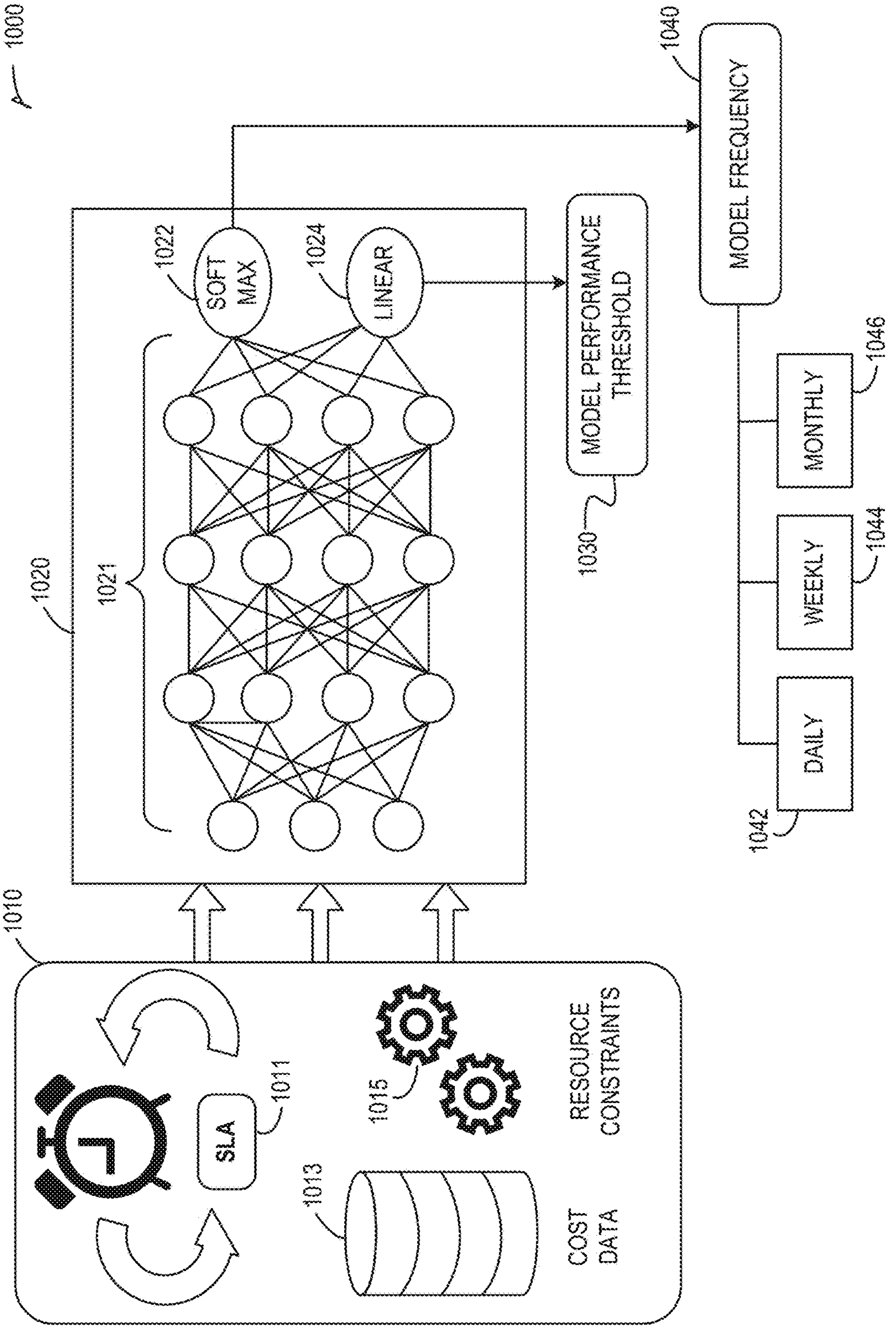
FIG. 10 is a block diagram depicting a dynamic configuration for model monitoring and model refresh, in accordance with aspects of the invention.

FIG. 10 is a block diagram 1000 depicting a dynamic configuration for model monitoring and model refresh, in accordance with aspects of the invention. In embodiments, a dynamic configuration for model monitoring and model refresh is to help identify an optimum frequency and correct threshold to refresh the model for a given tenant using their cost spends and constraints. Resources and configuration data 1010 for a tenant may include service level agreement (SLA) information 1011 such as running time constraints for model performance, cost data 1013, and resource constraints 1015. In an example, a tenant may contract for a certain level of accuracy in the SLA which may require more frequent model refresh. In another example, a tenant may include cost data 1013 including limits on spending. Model refresh may be dependent on spending limits. In an example, the resources 1015 available to the tenant, e.g., processing speed, storage available, production costs, etc., may drive the refresh frequency. In the discussion herein, model frequency refers to how often a model should be refreshed based on current cost spends from tenant, i.e., daily, weekly, or monthly refresh. It will be understood that although daily 1042, weekly 1044, and monthly 1046 refresh periodicity is shown for illustrative purposes, the selected frequency may be longer or shorter based on the tenant's configuration, e.g., hourly, semi-annually, etc. A model performance threshold, also referred to as "model performance metric value," may trigger the model refresh if the model performance metric value is lower than a pre-defined model performance threshold e.g., 80%, 70%, or 76%, etc. Different tenants may use a different threshold and may depend in part on the SLA 1011.

In an embodiment, the deep learning neural network 1021 identifies similar tenants. This model uses historical infrastructure data 1010 that may include input which contains cost and asset data. Cost data comprises AssetId, asset type, unit cost, total cost, region, data center, period, and description. Reservation details and asset data comprise of asset name, utilization, allTags, asset source, etc., as well as types of providers and maturity of the customer/tenant. In an example, a given input space is first converted into numerical vector space using known embedding methods and a cosine similarity distance metric used to identify similar clients in higher dimensional space. A known distance based algorithm, such as K-nearest neighbors (KNN), with cosine similarity is used to identify top K clients which match a given tenant and gives a majority voting to identify a similar tenant (if one exists).

In an embodiment, service level agreement (SLA) 1011 may include time constraints in units of seconds. Resource constraints may include data for scalability, regulatory, maintainability, serviceability, security, and cost. Cost data may contain AssetId, asset type, unit cost, total cost, region, data center, period, and description. Outputs of the deep learning neural network 1021 include a model performance threshold 1030 and model refresh frequency 1040. Two different loss functions may be used to learn the outputs. As discussed above, softmax is used to determine the model refresh frequency 1040, and linear regression is used to identify the model performance threshold 1030. In particular, softmax is a generalization of the logistic function to multiple dimensions, and used in multinomial logistic regression, and may be used to normalize output of the neural network 1021. The deep learning neural network uses a Leaky Rectified Linear Unit (Leaky ReLU) function across the hidden layers. Leaky ReLU is a type of activation function based on a ReLU, but it has a small slope for negative values instead of a flat slope. The slope coefficient may be determined before training, i.e., the slope coefficient may not be learned during training. Input is passed to deep hidden layers where weights have been shared among each other for both outputs. After backpropagation and forward propagation models are used to reduce the loss and return the model refresh frequency 1040 and model performance threshold 1030 for the tenant.

Model management 1020 may identify a new champion model, i.e., an accurate model for the tenant's configuration, from a specific tenant and may apply the champion model to others and create a challenger for all tenants. In other words, if there is a tenant with better data than that provided during model training, a higher accuracy model may be created. The higher accuracy model can benefit models between tenants securely without sharing data.

The model management 1020 considers the tenant type and tenant resources, e.g., bronze, sliver, gold, or entry, standard, enterprise, etc., so that the trained deep learning model 1021 is able to execute on the data 1010 of the tenant successfully within the resource constraints 1015, cost 1013 and performance 1011 constraints for the tenant. In an example, the deep learning 1021 is a neural network that may use a softmax function 1022 to assign decimal probabilities to each class in a multi-class problem. Softmax function 1022 may be used to determine a best model refresh frequency. Linear regression 1024 may be used to identify a best model performance threshold. Linear regression may be a supervised learning technique that involves learning the relationship between the features and the target. Alternatively, other algorithms and techniques may be used with the neural network 1021 to help determine model refresh frequency and model performance or accuracy thresholds.

For some tenants the database, application, and CPU resources and history can be very different, even for a similar industry. In an example, one tenant may have four months of historical data, and another tenant may have 13 months of historic data. The refresh/customized model should be able to perform within the resources, data, and cost constraints for that tenant. Using a deep learning model 1021 assists in automatically identifying configuration customizations for individual tenants.

The model performance thresholds 1030 may be determined and adjusted dynamically and continuously for each tenant for the model customization/refresh 1040 by evaluating the data, usage behavior, drifts and tenant type and cost. In an example, if the tenant ingests data weekly or monthly, instead of daily, the time threshold can dynamically change to weekly or monthly.

Figure 11:
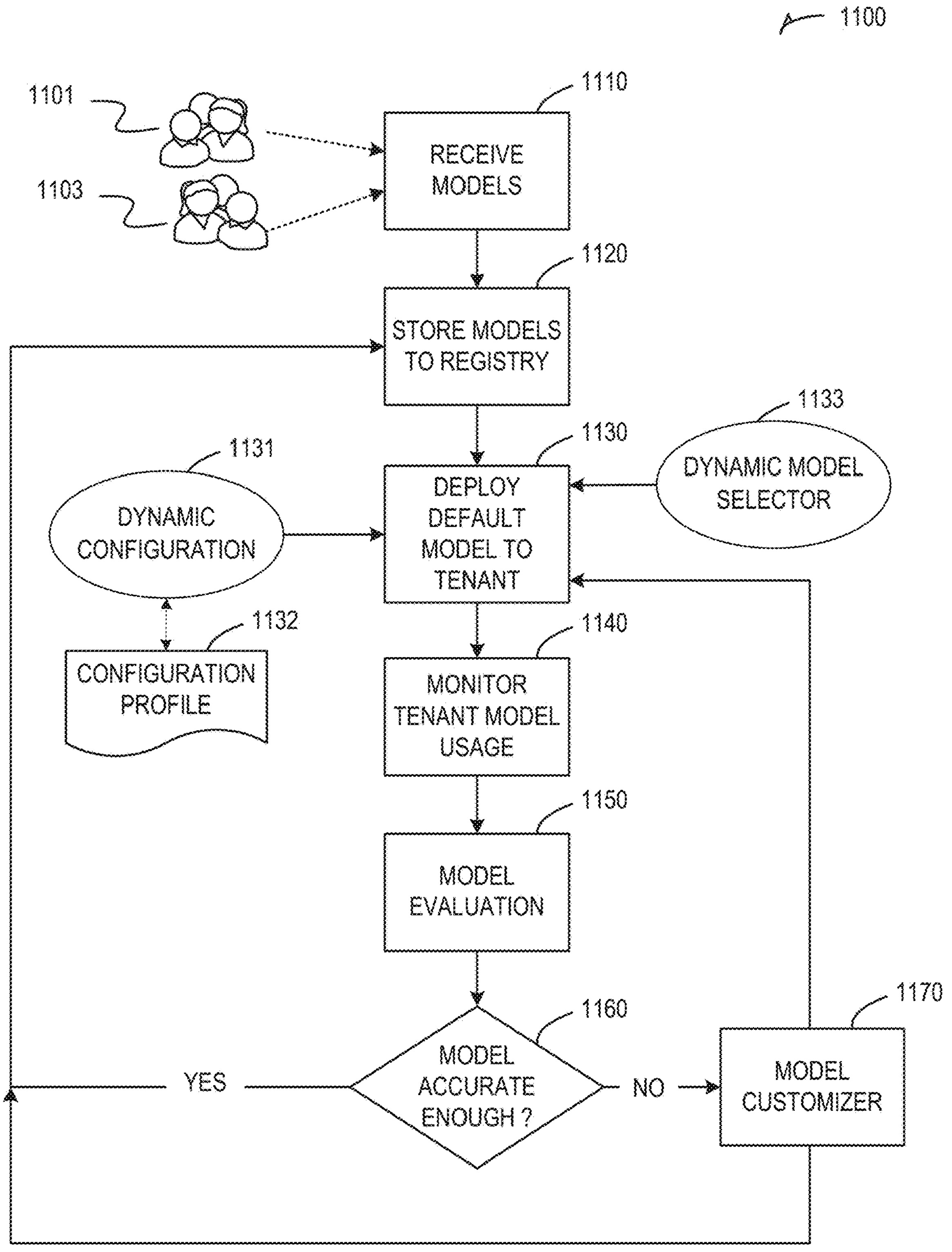
FIG. 11 is a flow diagram depicting an exemplary method for managing model Ops, in accordance with aspects of the invention.

FIG. 11 is a flow diagram depicting an exemplary method 1100 for managing model operations (MLOps), in accordance with aspects of the invention. In a multi-tenant cloud environment, multiple tenants will subscribe to machine learning (ML) models from one or more providers to make forecasts, predictions, or to help manage their business' cloud and resource usage. A tenant corresponds to a configuration file, also referred to as a configuration profile, and will be identified as a specific category based on their business type, size, location, cost, and resource constraints, etc. A cloud model provider may develop their own models using in-house data scientists 1101 and/or use third party models developed by outside data scientists or organizations 1103. Each model may correspond to a different ML algorithm such as random forest, decision trees, gradient boosting trees, support vector machine (SVM), Naïve Bayes, KNN, linear regression, logical regression, deep learning, and other algorithms now known or to be developed in the future. It will be understood that different algorithms work better for different data sets (both size and type), and resource constraints. Therefore, some models will be better suited for a tenant based on its configuration profile. The cloud model provider receives the models from the data scientists and/or third party in block 1110. The cloud model provider stores the various models in a model registry in block 1120. The model registry may be a local storage media or be accessed across a network remotely. The model registry may be distributed between or among more than one physical storage media, such as the storage system 34 of FIG. 1. The ML models are stored with a corresponding identifier for model version, and criteria for use as a default model based on a tenant's configuration profile. Some models may be designated as champion models for one or more tenant category.

The initial model used by the tenant may be automatically selected using a dynamic model selector (DMS) ML model 1133. Once the automatically selected model has been deployed to the tenant in 1130, corresponding to operation (1) of FIG. 8, tenant model usage is monitored at block 1140, corresponding to operation (9) of FIG. 8. The initial periodicity of monitoring, or refresh frequency, is informed by the tenant's configuration profile 1132, as shown corresponding to input of operation (2) of FIG. 8, and is triggered corresponding to operation (2) of FIG. 8. The usage of the model deployed to the tenant is monitored for accuracy, data drift and concept drift at the pre-determined frequency. Monitoring at block 1140 may identify that some of the underlying assumptions about tenant type and business scope may be determined during model evaluation 1150. As discussed above, the tenant may have entered a new region, changed or added to its product or service list, increased or decreased its business or revenue stream, added or omitted computing or staff resources, changed its ML model budget for cloud subscriptions, etc. This information is automatically provided to the dynamic configuration model 1131 to update the configuration profile 1132 of the tenant. The model evaluation 1150 may evaluate the model and then may determine whether the model is accurate enough for the tenant at block 1160, corresponding to operation (3) of FIG. 8. The threshold accuracy metric may be retrieved from the tenant's configuration profile.

When a tenant subscribes to the cloud model service, a default ML model may be automatically deployed to the tenant based on the tenant's initial configuration profile 1132, in block 1130. In an example, the configuration profile may include information for data pull, data prep, feature engineering, model search, model validation and testing, and model evaluation. A data scientist may create the initial configuration profile for a tenant or a set of similar tenants. In an example, the data pull is the time period for querying usage for a refresh. The data prep may include information regarding joins, filtering, sampling, missing values, imputations, etc. Feature engineering may include derived features, aggregations, text mining, etc. Model search may include a subset of models and parameters to use for testing the models during a refresh cycle. In an example, the models selected may include parameters such as maximum depth, learning rate, number of trees to test, etc. Using an initial same configuration profile for multiple similar tenants improves the costs as compared to a data scientist needing to create an initial customized profile for every tenant individually. The configuration profile includes which technique should be used for validation of the models, as well as a metric for evaluating the validation test.

The configuration profile 1132 may be dynamically modified by a dynamic configuration ML model 1131, as discussed in detail above in conjunction with FIGS. 8-10, and informs the triggering operation (2) of FIG. 8. The configuration profile 1132 may correspond to cost data, resource constraints, SLA with the cloud model provider, and may define model refresh frequency and model performance thresholds. These metrics and thresholds may be dynamically updated based on the model performance, data drift, concept drift, etc.

The initial model used by the tenant may be automatically selected using a dynamic model selector (DMS) ML model 1133. Once the automatically selected model has been deployed to the tenant in 1130, tenant model usage is monitored at block 1140. The initial periodicity of monitoring, or refresh frequency, is informed by the tenant's configuration profile 1132. The usage of the model deployed to the tenant is monitored for accuracy, data drift and concept drift at the pre-determined frequency. Monitoring at block 1150 may identify that some of the underlying assumptions about tenant type and business scope may be determined during model evaluation. As discussed above, the tenant may have entered a new region, changed or added to its product or service list, increased or decreased its business or revenue stream, added or omitted computing or staff resources, changed its ML model budget for cloud subscriptions, etc. This information is automatically provided to the dynamic configuration model 1131 to update the configuration profile 1132 of the tenant. The model evaluation 1150 may evaluate the model and then may determine whether the model is accurate enough for the tenant at block 1160. The threshold accuracy metric may be retrieved from the tenant's configuration profile.

If the model is accurate enough as determined in block 1160, this information is provided to the model registry so that the model in use may be deemed a champion model corresponding to the tenant's business category, cost, and resource constraints, etc., and corresponding to operation (10) of FIG. 8. Accordingly, determining the model as a champion model allows the model to be selected by the DMS 1133 as a default or refresh model for tenants with similar configurations. If the model is deemed not to be accurate enough in block 1160, then a model customizer operation is performed at 1170, corresponding to operation (4) of FIG. 8. The model customizer 1170 may generate an alternate version of the model, e.g., generating a Model 1.2 from original Model 1 (See FIG. 8, Model 1 (803A) and Model 1.2 (803D)). This new Model 1.2 is stored in the model registry at block 1120 and corresponds to the new tenant configuration profile, corresponding to operation (5) of FIG. 8. This model variant may also be stored in model registry as a champion model, allowing it to be used for other tenants, corresponding to operation (6) of FIG. 8. Deploying the variant model to a newly subscribing tenant corresponds to operation (8) of FIG. 8. Alternatively, the model customizer 1170, in conjunction with the DMS 1133, may determine that another model in the model registry, for instance, Model 2 (803B) in FIG. 8 might be better suited for the tenant. When necessary, the new version or alternative ML model is deployed to the tenant for immediate use, in place of the original or previously used ML model, corresponding to operation (7) of FIG. 8. A notification may be sent to the tenant and/or data scientist either before, concurrently, or after a new model is deployed. The data scientist or tenant may have veto power over whether the new model should be deployed. Tenant model usage and monitoring continue at block 1140 at the appropriate refresh frequency. It will be understood that as the configuration profile of a tenant may be dynamically changed, the refresh rate and accuracy thresholds may also be updated. This automatic monitoring of model accuracy, drift, etc., and the automatic deployment of new ML models to the tenant enables the tenant to perform their business forecasts with the best models possible without unnecessary delays caused by human intervention, by eliminating much of the cycle requiring data scientist interaction.

In embodiments, the MLOps cloud server comprises a dynamic configuration model 1131, a dynamic model selector model 1133, a model monitoring module 1140, model evaluation module 1150, and a model customizer module 1170, each of which may comprise one or more program modules such as program modules 42 described with respect to FIG. 1. The MLOps cloud server may include additional or fewer modules than those shown in FIGS. 8-11. In embodiments, separate modules may be integrated into a single module. Additionally, or alternatively, a single module may be implemented as multiple modules. Moreover, the quantity of devices and/or networks in the environment is not limited to what is shown in FIGS. 8-11. In practice, the environment may include additional devices and/or networks; fewer devices and/or networks; different devices and/or networks; or differently arranged devices and/or networks than illustrated in FIGS. 1-3.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:

automatically selecting, by a multi-tenant cloud server, one of at least one subscription machine learning (ML) models in a model registry based on a tenant configuration profile of a tenant, responsive to receiving a request for the subscription ML model, wherein the tenant configuration profile includes information for data pull, data prep, feature engineering, model search, model validation and testing, and model evaluation associated with cloud service needs of the tenant;

deploying, by the multi-tenant cloud server, the automatically selected subscription ML model to the tenant as a currently operating ML model;

monitoring, by the multi-tenant cloud server, usage of the currently operating ML model at a pre-determined refresh frequency using a dynamic configuration machine learning model, the pre-determined refresh frequency based at least on the tenant configuration profile and a configuration profile category of the currently operating ML model;

determining, by the multi-tenant cloud server, whether the currently operating ML model exceeds a pre-determined accuracy threshold; and automatically deploying, by the multi-tenant cloud server, a second subscription ML model from the model registry to the tenant in place of the currently operating ML model and becoming the currently operating ML model in response to the pre-determined accuracy threshold not being exceeded.

2. The computer implemented method as recited in claim 1, further comprising:

receiving by the multi-tenant cloud server, the at least one subscription machine learning (ML) model; and storing, by the multi-tenant cloud server, the at least one subscription ML model in the model registry communicatively coupled to the multi-tenant cloud server, each of the at least one subscription ML models corresponding to a pre-determined configuration profile category, the pre-determined configuration profile category including an accuracy threshold and refresh frequency, wherein the pre-determined accuracy threshold is based at least on the accuracy threshold of the configuration profile category of the currently operating ML model.

3. The computer implemented method as recited in claim 1, further comprising:

automatically updating, by the multi-tenant cloud server, the tenant configuration profile using the dynamic configuration machine learning model, based at least on one of model performance of the currently operating ML model, cost data of the tenant, resource constraints of the tenant, or a service level agreement between the tenant and the multi-tenant cloud server.

4. The computer implemented method as recited in claim 3, wherein automatically updating the tenant configuration profile further comprises performing at least one of:

automatically modifying the accuracy threshold corresponding to the tenant and the currently operating ML model, and automatically modifying the pre-determined refresh frequency corresponding to the tenant and the currently operating ML model, in the tenant configuration profile.

5. The computer implemented method as recited in claim 1, wherein the automatically selecting one of the at least one subscription ML models in the model registry further comprises:

selecting the one of the at least one subscription ML models using a dynamic model selector (DMS) machine learning (ML) model based at least on infrastructure of the tenant, low/medium/high profile feature of the tenant, tenant configuration profile and subscription ML model configuration category.

6. The computer implemented method as recited in claim 1, further comprising:

automatically updating, by the multi-tenant cloud server, the configuration profile category of the currently running ML model based at least on historical model performance of the currently running ML model in one or more of a plurality of tenants using the currently running ML model.

7. The computer implemented method as recited in claim 1, wherein the pre-determined refresh frequency for the pre-determined configuration profile category of the currently running ML model is selected from the group of pre-determined refresh frequencies consisting of: hourly, daily, weekly, semi-weekly, bi weekly, monthly, semi-monthly, bi-monthly, annually, and semi-annually.

8. The computer implemented method as recited in claim 1, further comprising:

continuing to monitor, by the multi-tenant cloud server, usage of the currently operating ML model at the pre-determined refresh frequency, the pre-determined refresh frequency based at least on the tenant configuration profile and the configuration profile category of the currently operating ML model;

generating, by the multi-tenant cloud server, a new version of the currently running ML model based at least on historical model performance of the currently running ML model in one or more of a plurality of tenants using the currently running ML model;

associating, by the multi-tenant cloud server, the new version of the currently running ML model with a new pre-determined configuration profile category; and storing, by the multi-tenant cloud server, the new version of the currently running ML model in the model registry as a default ML model for the new pre-determined configuration profile category.

9. The computer implemented method as recited in claim 1, wherein the subscription ML model is a cloud cost forecasting model.

10. A computer program product comprising one or more computer readable storage media having program instructions collectively stored on the one or more computer readable storage media, the program instructions that when executed:

automatically select one of at least one subscription machine learning (ML) models in a model registry based on a tenant configuration profile of a tenant, responsive to receiving a request for the subscription ML model, wherein the tenant configuration profile includes information associated with cloud service needs of the tenant;

deploy the automatically selected subscription ML model to the tenant as a currently operating ML model;

monitor usage of the currently operating ML model at a pre-determined refresh frequency using a dynamic configuration machine learning model, the pre-determined refresh frequency based at least on the tenant configuration profile and a configuration profile category of the currently operating ML model;

determine whether the currently operating ML model exceeds a pre-determined accuracy threshold; and automatically deploy a second subscription ML model from the model registry to the tenant in place of the currently operating ML model and becoming the currently operating ML model in response to the pre-determined accuracy threshold not being exceeded.

11. The computer program product as recited in claim 10, further comprising program instructions that when executed:

receive at least one subscription ML model; and store the at least one subscription ML model in the model registry communicatively coupled to a multi-tenant cloud server, each of the at least one subscription ML models corresponding to a pre-determined configuration profile category, the pre-determined configuration profile category including an accuracy threshold and refresh frequency, wherein the pre-determined accuracy threshold is based at least on the accuracy threshold of the configuration profile category of the currently operating ML model.

12. The computer program product as recited in claim 11, wherein automatically updating the tenant configuration profile further comprises program instructions, that when executed, perform at least one of:

automatically modify the accuracy threshold corresponding to the tenant and the currently operating ML model, and automatically modify the pre-determined refresh frequency corresponding to the tenant and the currently operating ML model, in the tenant configuration profile.

13. The computer program product as recited in claim 10, further comprising program instructions that when executed:

automatically update the tenant configuration profile using the dynamic configuration machine learning model, based at least on one of model performance of the currently operating ML model, cost data of the tenant, resource constraints of the tenant, or a service level agreement between the tenant and the multi-tenant cloud server.

14. The computer program product as recited in claim 10, wherein the automatically selecting one of the at least one subscription ML models in the model registry further comprises program instructions that when executed:

select the one of the at least one subscription ML models using a dynamic model selector (DMS) machine learning (ML) model based at least on infrastructure of the tenant, low/medium/high profile feature of the tenant, tenant configuration profile and subscription ML model configuration category.

15. The computer program product as recited in claim 10, further comprising program instructions that when executed:

automatically update the pre-determined configuration profile category of the currently running ML model based at least on historical model performance of the currently running ML model in one or more of a plurality of tenants using the currently running ML model.

16. The computer program product as recited in claim 10, wherein the pre-determined refresh frequency for the pre-determined configuration profile category of the currently running ML model is selected from the group of pre-determined refresh frequencies consisting of: hourly, daily, weekly, semi-weekly, bi weekly, monthly, semi-monthly, bi-monthly, annually, and semi-annually.

17. The computer program product as recited in claim 10, further comprising program instructions that when executed:

continue to monitor usage of the currently operating ML model at the pre-determined refresh frequency, the pre-determined refresh frequency based at least on the tenant configuration profile and the configuration profile category of the currently operating ML model;

generate a new version of the currently running ML model based at least on historical model performance of the currently running ML model in one or more of a plurality of tenants using the currently running ML model;

associate the new version of the currently running ML model with a new pre-determined configuration profile category; and store the new version of the currently running ML model in the model registry as a default ML model for the new pre-determined configuration profile category.

18. A system comprising:

a processor, a computer readable memory, one or more computer readable storage media, and program instructions collectively stored on the one or more computer readable storage media, the program instructions that when executed:

automatically select one of at least one subscription machine learning (ML) models in a model registry based on a tenant configuration profile of a tenant, responsive to receiving a request for the subscription ML model, wherein the tenant configuration profile includes information associated with cloud service needs of the tenant;

deploy the automatically selected subscription ML model to the tenant as a currently operating ML model;

monitor usage of the currently operating ML model at a pre-determined refresh frequency using a dynamic configuration machine learning model, the pre-determined refresh frequency based at least on the tenant configuration profile and a configuration profile category of the currently operating ML model;

determine whether the currently operating ML model exceeds a pre-determined accuracy threshold; and automatically deploy a second subscription ML model from the model registry to the tenant in place of the currently operating ML model and becoming the currently operating ML model in response to the pre-determined accuracy threshold not being exceeded.

19. The system as recited in claim 18, further comprising program instructions that when executed:

receive at least one subscription ML model; and store the at least one subscription ML model in the model registry communicatively coupled to a multi-tenant cloud server, each of the at least one subscription ML models corresponding to a pre-determined configuration profile category, the pre-determined configuration profile category including an accuracy threshold and refresh frequency, wherein the pre-determined accuracy threshold is based at least on the accuracy threshold of the configuration profile category of the currently operating ML model.

20. The system as recited in claim 18, further comprising program instructions that when executed:

continue to monitor usage of the currently operating ML model at the pre-determined refresh frequency, the pre-determined refresh frequency based at least on the tenant configuration profile and the configuration profile category of the currently operating ML model;

generate a new version of the currently running ML model based at least on historical model performance of the currently running ML model in one or more of a plurality of tenants using the currently running ML model;

associate the new version of the currently running ML model with a new pre-determined configuration profile category; and store the new version of the currently running ML model in the model registry as a default ML model for the new pre-determined configuration profile category.

* * * * *